(12) United States Patent
Blankenship et al.

(10) Patent No.: US 8,211,506 B2
(45) Date of Patent: Jul. 3, 2012

(54) COATING METHODS AND APPARATUS USING PRE-FORMED CERAMIC MASK

(75) Inventors: Donn R. Blankenship, Southbury, CT (US); Paul H. Zajchowski, Enfield, CT (US)

(73) Assignee: United Technologies Corporation, Hartford, CT (US)

( * ) Notice: Subject to any disclaimer, the term of this patent is extended or adjusted under 35 U.S.C. 154(b) by 527 days.

(21) Appl. No.: 12/400,877

(22) Filed: Mar. 10, 2009

(65) Prior Publication Data
US 2009/0286056 A1 Nov. 19, 2009

Related U.S. Application Data

(63) Continuation of application No. 11/267,965, filed on Nov. 7, 2005, now abandoned.

(51) Int. Cl.
*B05D 1/32* (2006.01)
*B05D 7/22* (2006.01)
*C23C 4/02* (2006.01)
*C23C 4/12* (2006.01)

(52) U.S. Cl. ........ 427/448; 427/230; 427/236; 427/239; 427/272; 427/282

(58) Field of Classification Search .................... 427/448
See application file for complete search history.

(56) References Cited

U.S. PATENT DOCUMENTS

| | | | |
|---|---|---|---|
| 3,607,381 A * | 9/1971 | Fairbairn | 427/448 |
| 3,687,850 A * | 8/1972 | Gagin et al. | 162/156 |
| 3,931,083 A * | 1/1976 | Sasaki et al. | 524/3 |
| 5,268,085 A | 12/1993 | Nelson et al. | |
| 6,071,324 A * | 6/2000 | Laul et al. | 75/252 |
| 6,592,948 B1 * | 7/2003 | Fusaro et al. | 427/448 |
| 6,645,299 B2 * | 11/2003 | Brown | 118/505 |
| 6,884,476 B2 | 4/2005 | Pfaendtner et al. | |
| 2002/0172769 A1 * | 11/2002 | Herber et al. | 427/271 |
| 2004/0191488 A1 * | 9/2004 | Berndt et al. | 428/195.1 |
| 2005/0106316 A1 * | 5/2005 | Rigney et al. | 427/140 |
| 2005/0181222 A1 * | 8/2005 | Cox et al. | 428/447 |

FOREIGN PATENT DOCUMENTS

| | | |
|---|---|---|
| EP | 1293584 A | 3/2003 |
| EP | 1365039 A | 11/2003 |
| GB | 2348439 A | 4/2000 |
| JP | 64-053748 * | 4/1969 |
| JP | 64-36752 A | 2/1989 |
| JP | 7-166318 A | 6/1995 |
| JP | 10-183378 A | 7/1998 |
| JP | 2003306760 A1 | 10/2003 |
| JP | 2004-19490 A | 1/2004 |
| WO | 00/58531 A1 | 10/2000 |
| WO | 03085163 A1 | 10/2003 |

OTHER PUBLICATIONS

Korean Office Action for KR10-2006-55160, dated Jul. 11, 2007.
European Search Report for 062556352, dated Aug. 21, 2007.
Japanese Office Action for JP2006-293741, dated Aug. 25, 2009.
European Office Action for EP Patent Application No. 06255635.2, dated Mar. 29, 2011.

* cited by examiner

*Primary Examiner* — Katherine A Bareford
(74) *Attorney, Agent, or Firm* — Bachman & LaPointe, P.C.

(57) ABSTRACT

A method for coating a part includes applying a ceramic mask to a first surface portion of the part. A coating is applied to a second surface portion of the part and at least partially contacting the mask. The mask is destructively removed.

17 Claims, 1 Drawing Sheet

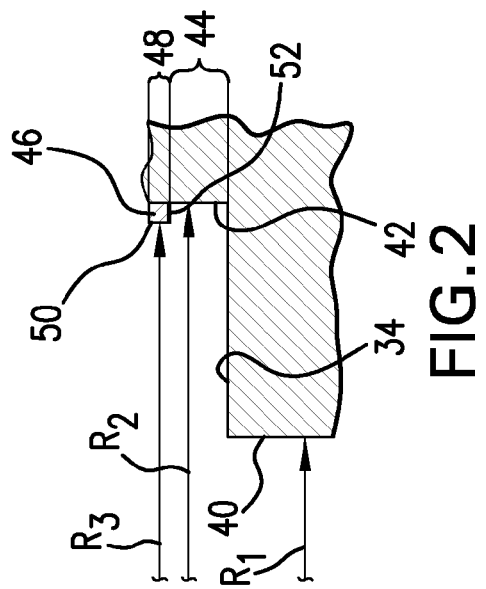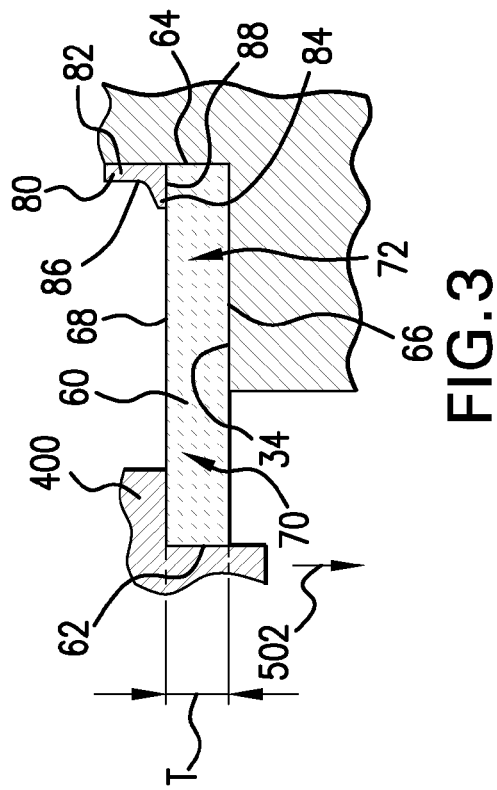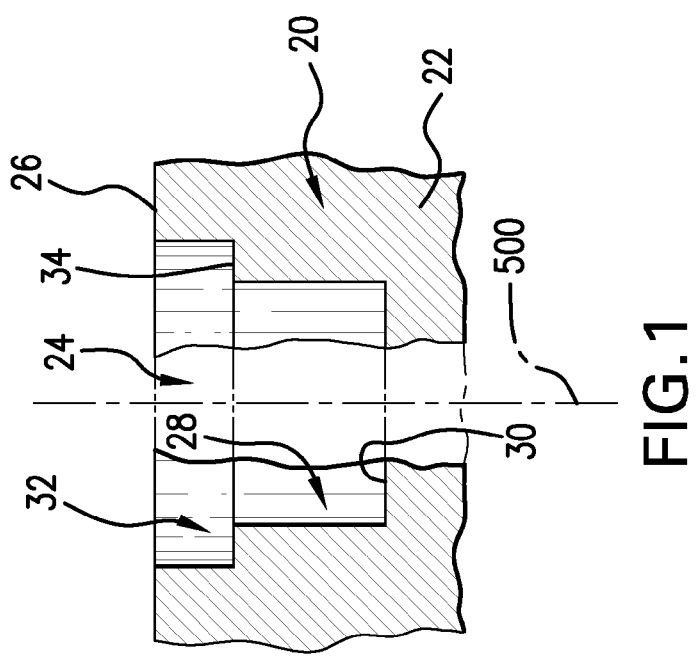

//COATING METHODS AND APPARATUS USING PRE-FORMED CERAMIC MASK

CROSS-REFERENCE TO RELATED APPLICATION

This is a continuation application of Ser. No. 11/267,965, filed Nov. 7, 2005, and entitled COATING METHODS AND APPARATUS USING PRE-FORMED CERAMIC MASK, now abandoned, the disclosure of which is incorporated by reference herein in its entirety as if set forth at length.

BACKGROUND OF THE INVENTION

The invention relates to protective coatings. More particularly, the invention relates to the application of protective coatings to metallic substrates.

In the aerospace industry, it is known to apply protective coatings to metallic substrates. Exemplary coatings may be configured to provide one or more of wear protection, thermal protection, and chemical protection. Exemplary substrate materials are nickel-, cobalt-, and/or iron-based superalloys. Coating materials may vary by application. Exemplary wear coatings include carbide-based coatings and MCrAlY coatings. Such coatings may be applied as single layers or in multiple layers. MCrAlY coatings are also known for use as bond coat layers in multilayer thermal barrier coatings (e.g., having a ceramic top coat). Exemplary application techniques include high temperature spray methods such as high velocity oxy-fuel (HVOF) deposition.

It is often desirable to mask areas of the substrate during application of the coating so that the masked portions of the substrate remain uncoated. As applied, the coating often bridges between the substrate and adjacent portions of the mask. To withstand the temperatures of deposition, exemplary masks are metallic. Adhesion between the coating and the mask may, upon mask removal, produce chipping, delamination, or other damage of the coating along the substrate.

U.S. Pat. No. 6,592,948 of Fusaro, Jr. et al. identifies a multi-part/multi-step masking system for thermal barrier coatings. That exemplary system utilizes the combination of a metal foil sheet and a durable tape.

SUMMARY OF THE INVENTION

A method for coating a part includes applying a ceramic mask to a first surface portion of the part. A coating is applied to a second surface portion of the part and at least partially contacting the mask. The mask is destructively removed.

In various implementations, the mask may be held to the part by clamping. The applying may include inserting into a compartment. The mask removal may include shattering. The coating application may involve HVOF coating. The method may be used to replace or restore an initial worn or otherwise damaged coating.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 1 is a sectional view of a compartment in a coated substrate.

FIG. 2 is an enlarged view of a portion of the compartment of FIG. 1.

FIG. 3 is a view of the portion of FIG. 2 during application of a coating material.

Like reference numbers and designations in the various drawings indicate like elements.

DETAILED DESCRIPTION

FIG. 1 shows a part 20 including a coated substrate 22. An exemplary substrate may be of a nickel-, cobalt-, and/or iron-based superalloy. The exemplary part 20 may be an aerospace component. Exemplary components may be of gas turbine engines (e.g., blades, vanes, seals, structural components, shafts, disks, and the like). The exemplary part 20 is shown as having a compartment 24, one portion of which is to be coated (e.g., using conventional or other HVOF apparatus) and another portion of which is to remain uncoated. Nevertheless, the present teachings may be applicable to other coated and uncoated portions of other parts and to other basic coating apparatus/methods.

The exemplary compartment 24 may extend along a central axis 500 inward from an exterior surface 26 of the substrate. The exemplary compartment 24 may be a blind counterbored compartment having an inboard bore 28 having a base 30. An outboard counterbore 32 may extend to the surface 26. The counterbore 32 may be separated from the bore 28 by an annular shoulder surface 34.

FIG. 2 shows the bore 28 as having a lateral/side surface 40 at a radius $R_1$ from the axis 500. The counterbore 32 may have a lateral/side surface 42 at a radius $R_2$. Along a portion 44 the surface 42 may be uncoated. A coating 46 is formed on the surface 42 along a portion 48 outboard of the portion 44. The coating 46 may have a radially inboard surface 50 at a radius $R_3$ from the axis 500. The coating 46 may have a longitudinally inboard terminal/end surface 52.

To apply the coating 46, it may be desirable to mask the shoulder surface 34 and the surface 42 along the inboard portion 44.

A mask 60 may be inserted into the compartment (e.g., in a direction 502). The exemplary mask 60 may be formed as an annular disk having a body extending from a radially inboard surface 62 at a central aperture to a radially outboard surface 64 at a perimeter. The mask has first and second faces 66 and 68 with a thickness T therebetween. The mask 60 may be placed in the compartment so that an inboard portion 70 extends over the bore 28. Along an outboard portion 72, the first face 66 may contact the shoulder surface 34. The surface 64 may be in close facing or contacting relationship to the surface 42 along the inboard portion 44 of the counterbore.

The mask may be retained in engagement with the substrate. Exemplary engagement is by non-adhesive mechanical means. Exemplary mechanical means include a clamp 400 engaging the inboard portion 70 and biasing the mask in the direction 502. The exemplary clamp 400 may be a portion of a fixture supporting the substrate during coating application and/or additional steps. With the mask engaged, the coating 80 may be built-up (e.g., by HVOF spray). Exemplary coatings are carbide-based (e.g., consisting in majority weight part of one or more of WC, CrC, and NiCrC), NiCrCo, MCrAlY, NiAl, or other nickel alloy coatings. Exemplary HVOF spray apparatus and methods may involve substrate temperatures of 300-500° F.

The as-sprayed coating 80 has a first portion 82 principally along the surface 42 and a bridging portion 84 protruding radially inward along the mask second face 68. The as-applied coating has a compartment-facing surface 86 and a surface 88 along the mask. After coating application, it may be desirable to machine the surface 86 down to the diameter $R_3$. During machining, vibration and/or direct contact of the machining tool with the mask 60 may tend to destroy the mask, preferably by shattering. By shattering the mask (distinguished from pulling off a metal mask), the chances of coating delamination from the substrate may be greatly reduced. The mask is advantageously sufficiently brittle to facilitate the shattering. The machining may occur with the clamp 400 engaged or disengaged.

Exemplary mask materials include AlOx-based ceramics. The mask may be manufactured by molding a so-called green ceramic in the shape of the area to be masked and then firing the green ceramic to harden. Exemplary mask thicknesses are in excess of 0.001 inch, more narrowly at least 0.10 inch (e.g., 0.10-5 inches, or more).

In addition to use of the mask 60 during an original coating, the mask may be used during a recoating or restoration. For example, wear or other damage to the surface 50 may bring such surface out of a desired specification (e.g., by expanding average $R_3$ or variations in $R_3$ beyond specified amounts). In such a recoating/restoration, the coating 46 may be fully or partially removed (e.g., by grit blasting). Thereafter, the mask 60 may be put in place and clamped. Additional coating may be applied to achieve similar results as described above.

One or more embodiments of the present invention have been described. Nevertheless, it will be understood that various modifications may be made without departing from the spirit and scope of the invention. For example, the methods may be used with existing parts and coating systems. In such situations, details of the existing parts and/or systems may influence details of any particular implementation. The methods may be used to apply coatings to parts or specific parts or types of parts where metallic or other dissimilar masks had previously been used. Additionally, the methods may be used in yet new situations. Accordingly, other embodiments are within the scope of the following claims.

What is claimed is:

1. A method for coating a part comprising:
   applying a pre-formed ceramic mask to a first surface portion of the part, the applying of the mask comprising inserting into a compartment and clamping to a shoulder surface of the compartment;
   applying a coating to a second surface portion of the part and at least partially contacting the mask; and
   destructively removing the mask, the destructively removing comprising fracturing the mask.

2. The method of claim 1 further comprising:
   forming the part including casting or forging.
3. The method of claim 1 wherein:
   the mask is retained non-adhesively.
4. The method of claim 1 wherein:
   the mask is essentially annular.
5. The method of claim 1 wherein:
   the mask comprises an AlOx-based material.
6. The method of claim 1 wherein:
   the applying of the mask comprises securing a hardened ceramic.
7. The method of claim 1 wherein:
   the applying of the mask comprises applying a molded and fired mask.
8. The method of claim 1 wherein:
   the applying of the coating comprises high velocity oxy-fuel (HVOF) coating.
9. The method of claim 1 wherein:
   the applying of the coating involves peak part temperatures of at least 300° F.
10. The method of claim 1 wherein:
    the coating comprises a carbide-based material.
11. The method of claim 1 wherein:
    the part is a gas turbine engine component having a nickel-, cobalt-, and/or iron-based substrate.
12. The method of claim 1 wherein:
    the mask comprises an annular disk having a central aperture.
13. The method of claim 1 wherein:
    the destructively removing comprises shattering the mask.
14. The method of claim 1 wherein:
    the destructively removing occurs essentially in the absence of delamination of the coating from the second surface portion.
15. The method of claim 1 further comprising:
    at least partially removing an initial coating from the second surface portion.
16. The method of claim 15 wherein:
    said initial coating had previously been applied to the part using a metallic mask to mask the first surface portion.
17. The method of claim 1 wherein:
    the destructively removing the mask leaves the coating on a portion of a lateral surface of the compartment outboard of the mask and leaves a portion of the lateral surface adjacent the mask uncoated.

* * * * *